March 4, 1952 D. K. HINES 2,588,115
SEDIMENTATION DEVICE
Filed Feb. 16, 1946 5 Sheets-Sheet 1

INVENTOR.
Dealy K. Hines
BY
Blair, Curtis & Hayward
ATTORNEYS

March 4, 1952 — D. K. HINES — 2,588,115
SEDIMENTATION DEVICE
Filed Feb. 16, 1946 — 5 Sheets-Sheet 5

INVENTOR.
Dealy K. Hines
BY
Blair, Curtis & Hayward
ATTORNEYS

Patented Mar. 4, 1952

2,588,115

UNITED STATES PATENT OFFICE 2,588,115

SEDIMENTATION DEVICE

Dealy K. Hines, Oceanside, N. Y., assignor to General American Transportation Corporation, Chicago, Ill., a corporation of New York Application February 16, 1946, Serial No. 648,156

2 Claims. (Cl. 210—55)

This invention relates to settling devices, e. g., such as are employed in sewage disposal, paper making, chemical manufacturing and mining, etc., to separate suspended solids from fluids, and particularly to thickeners, classifiers, washers and the like of the type in which a suspension is brought under controlled settling conditions in a tank having arms mounted to turn about an axis within the tank, these arms carrying rakes or scraper blades so inclined, and otherwise adapted, as to effect a desired movement of the settled or settling solids upon movement of the arms.

This invention is particularly applicable to apparatus in which a pair of rake arms are slowly rotated in a settling tank to gradually remove the settled solids to a discharge opening in the center of the tank. As solids settle from the liquids in a settling tank at different rates at different times, it is necessary to raise and lower the rake arms with respect to the bottom of the tank. The arms are raised when solids are settling at a faster rate than they can be discharged, thus relieving an overload on the driving mechanism and assuring efficient operation of the apparatus. When solids are settling at a rate below that at which they can be discharged from the tank, then the arms are lowered and the excess of solids which accumulated during the time the arms were raised is discharged.

Heretofore, a majority of rake arms have been raised and lowered by one or more screws, the screw or screws being turned manually or by power. As the rake arms are continually driven, friction makes it exceedingly difficult to turn the screw or screws. Indeed, in many instances, workmen endeavoring to turn a screw manually by using a crow bar or similar tool caused a breakdown necessitating shutting down the plant. Another result of the difficulty experienced by workmen in using a screw has been that the workmen do not adjust the rake arms as often as necessary, thus permitting the apparatus to work under heavy overloads which may either damage or break it.

Another type of apparatus for raising the rake arms has been to drive the rake arms through cams or screws which automatically cause the rake arms to be elevated when they are under an overload. In this type when an overload holds back the rake arms, parts connected to the rake arms wind up on the screw or climb the cam surfaces, thus raising the rake arms. This type has the difficulty that whenever the arms attempt to return to a lower position, they must rotate at a faster speed than the driving shaft against the friction of the cam or screw. Because at the same time the rake arms are being lowered they must bite into the accumulated solids at the bottom of the tank, this type of mechanism does not operate efficiently.

With the foregoing difficulties in mind, the present invention aims to provide practical and efficient mechanism for raising and lowering the rake arms which reduces the element of friction to a minimum and which may be simply and quickly operated by the workman or by automatic mechanism operating the settling tank. This invention further aims to provide means for imparting rotary movement to and raising and lowering the rake arms.

With the foregoing and other objects in view, the invention uses fluid pressure mechanism to raise and lower the rake arms, the mechanism advantageously comprising a piston and cylinder combination coaxial with the driving shaft. Also the mechanism is so arranged that the weight of the rake arms and associated mechanism is borne by a thrust bearing comprising the cushion of oil positioned between the heads of the piston and cylinder. This reduces friction to a minimum. Also according to the invention, improved mechanism for driving the rake arms is disclosed which drives the rake arms slowly and powerfully.

Other objects and important features of the invention to which reference has not specifically been made hereinabove will appear hereinafter when the following description and claims are considered in connection with the accompanying drawings.

In this specification and the accompanying drawings, I have shown and described a preferred embodiment of my invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In the drawings.

Similar reference characters refer to similar parts throughout the several views of the drawings.

Figure 2:
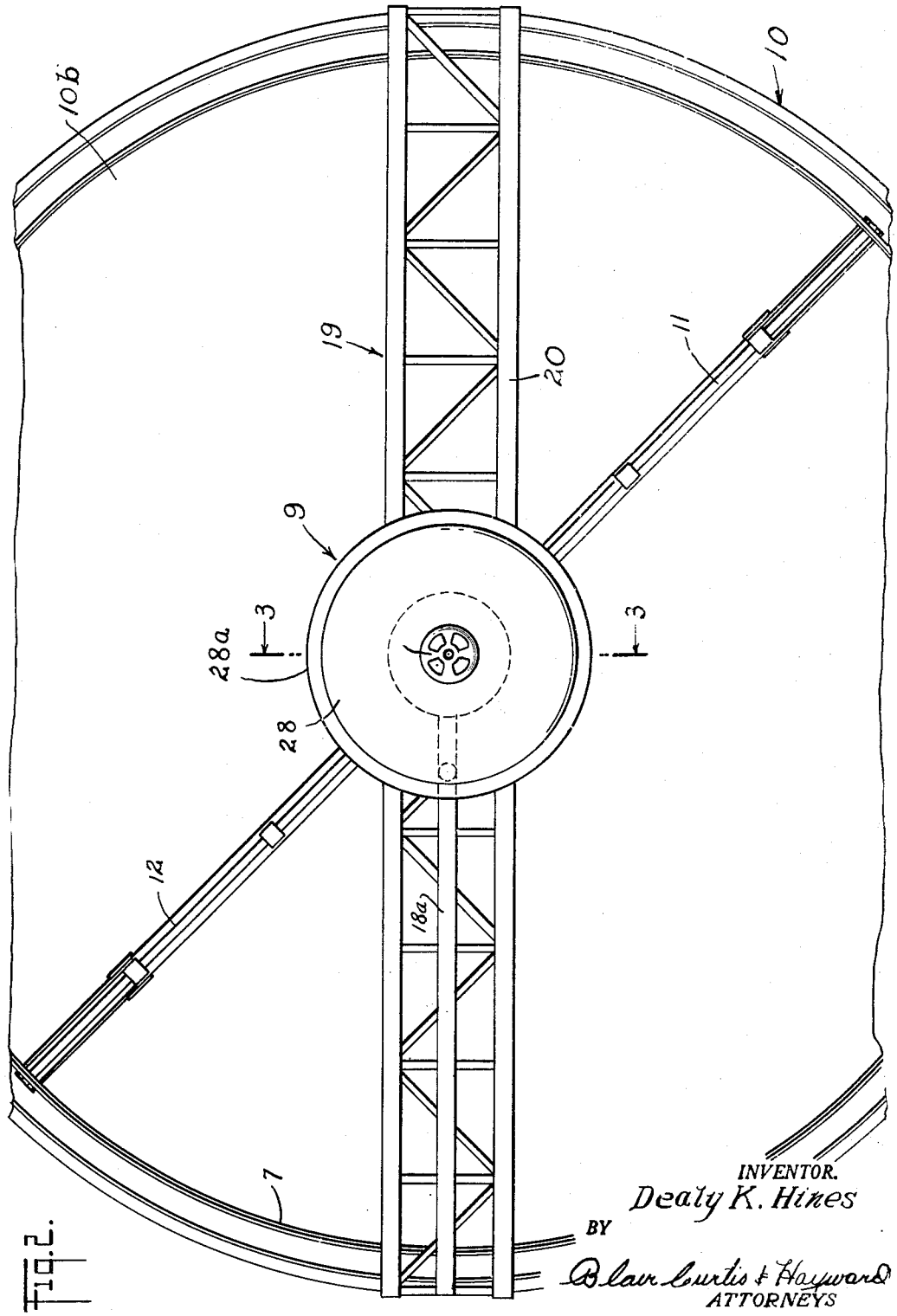
Figure 2 is a top plan view of the apparatus shown in Figure 1.

In the embodiment of this invention shown, a mechanism, generally indicated at 9, is provided for driving, raising, and lowering a pair of rake arms 11 and 12 mounted in a sedimentation tank 10 in which solids are separated from liquids. tank 10 is shown circular (Figure 2) but may be of other convenient shape. Rake arms 11 and 12 which are driven by mechanism 9 through shaft 13 have blades 16 and 17 which impel solids settling to the bottom of the tank 10 toward a discharge well 14 positioned in the center of the bottom of tank 10. Concentrated solids are drawn off as a sludge or slurry from well 14 through a discharge pipe 15. The liquids bearing the solids enter tank 10 through a conventional feed pipe 18a which is carried by the bridge or beams 19—20 and empties into a feed well 18 also mounted upon the bridge beams 19 and 20 (Figure 2). Clarified liquid may be removed by the usual peripheral overflow launder 7.

When the device is in operation, rake arms 11 and 12 rotate slowly in tank 10 and are driven by the mechanism, generally indicated at 9. So long as the inflow of solids is normal, there is a constant settling out to the bottom of the tank and the concentrated solids are impelled toward the discharge well 14. If, however, an abnormal inflow of solids should occur, the settled concentrate might become so heavy as to overload the mechanism. It would then be desirable to raise the rake arms allowing excess solids to accumulate in the bottom of the tank until the rate of feed is sufficiently reduced that they can be removed. At such later time when the rate of entry of solids is below normal, the excess of solids is removed by lowering the rake arms.

The raising and lowering of rake arms 11 and 12 is accomplished hydraulically by the mechanism, generally indicated at 9, all as will be described fully hereinafter.

Figure 1:
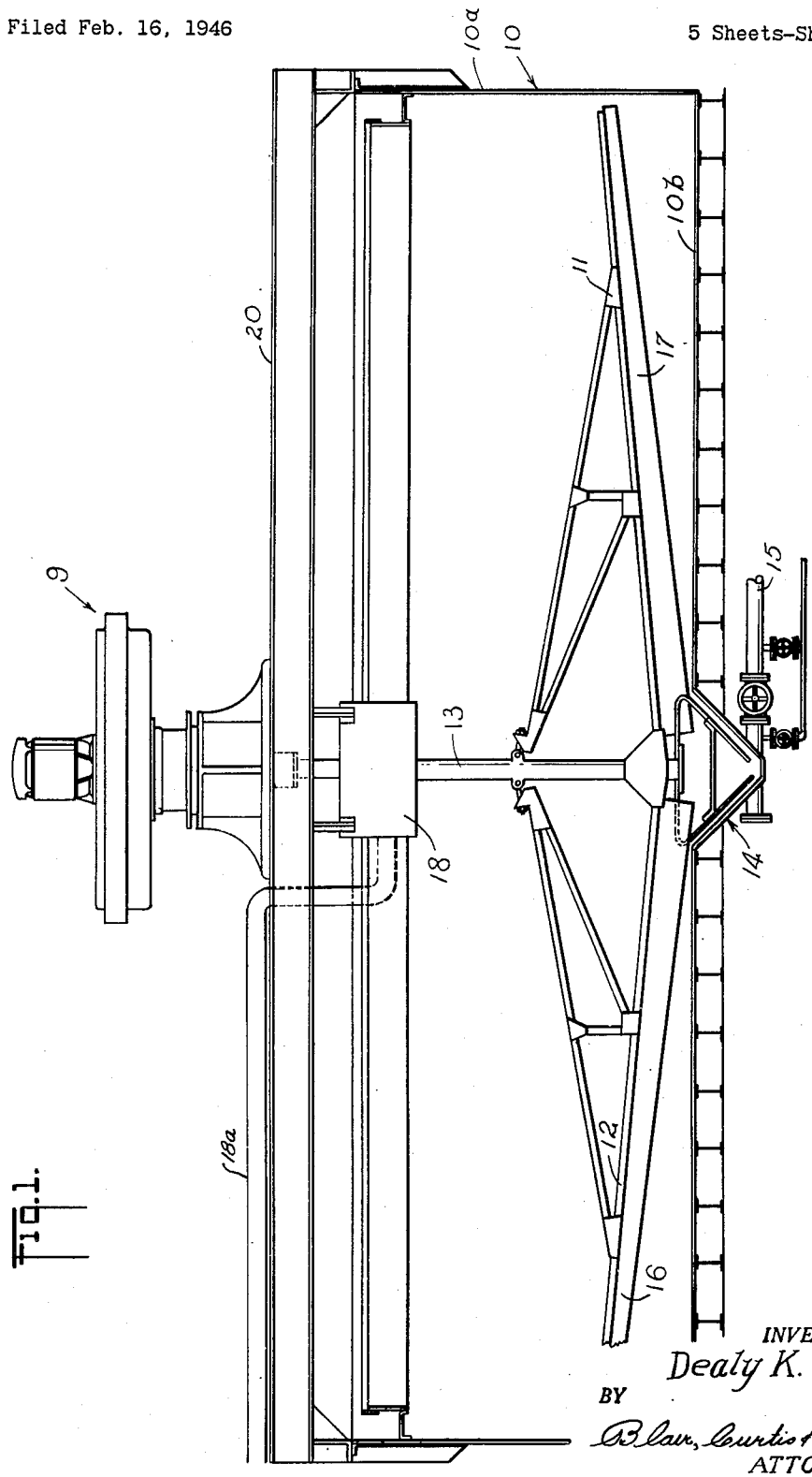
Figure 1 is a vertical section taken through a tank having the apparatus installed therein, the apparatus being shown in elevation.
Figure 3:
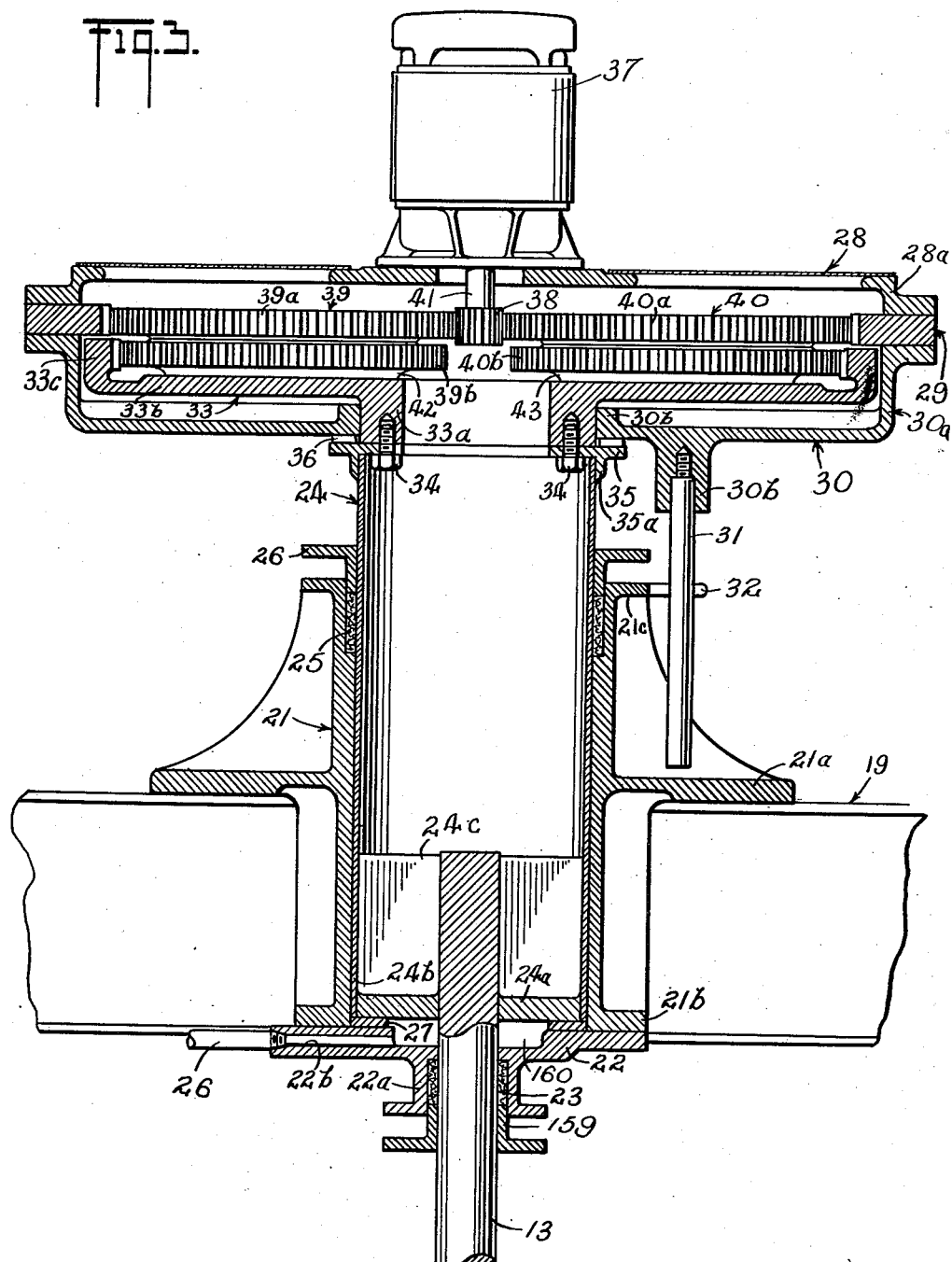
Figure 3 is a vertical section on an enlarged scale taken on the line 3—3 of Figure 2.

Mechanism 9 includes a piston cylinder, generally indicated at 21 (Figure 3), which has a circular flange 21a extending outwardly therefrom in a radial plane. This flange extends over, and is secured to, beams 19 and 20 (Figure 2) and supports mechanism 9 above the center of tank 10 (Figure 1). The lower end of cylinder 21 is closed by head 22 secured to an annular flange 21b. Head 22 includes a downwardly extending gland portion 22a through which shaft 13 passes. Portion 22a is provided with a packing 23 which prevents the hydraulic fluid from leaking from the interior of cylinder 21 along shaft 13 while permitting rotation of the shaft. A gland ring 159 is pressed against the packing 23 in any usual manner, e. g. by threading into the portion 22a or by bolts or clamps (not shown) engaging the respective flanges.

The piston, generally indicated at 24, comprises a head 24a welded to shaft 13 and across the lower end of cylindrically shaped sleeve 24b, which fits the bore of cylinder 21. Shaft 13 extends through a hole in the center of piston head 24a and is braced in the sleeve 24b in any suitable manner, such as by radial web plates 24c welded thereto.

The piston cylinder member 21 is advantageously a bronze casting with its inner surface accurately cylindrical and accurately fitted to the steel sleeve 24b. Thus these parts also serve as a bearing for the rotating shaft; and by use of a suitable lubricating oil as the hydraulic pressure fluid, this bearing is properly oiled thereby.

To prevent the hydraulic fluid from leaking upwardly between the walls of the cylinder and the piston, packing 25 is provided. This packing is held in position by a clamping ring 26 which is connected to flange 21c of cylinder 21 in any suitable manner, such as by bolts (not shown).

A space 160 is provided beneath cylinder head 24a into which the hydraulic fluid from pipe 26 is introduced through passage 22b. By introducing oil or any other hydraulic fluid beneath piston head 24a, the piston 24 is raised with respect to cylinder 21 and by releasing oil from beneath piston head 24a, piston 24 is lowered with respect to cylinder 21. Thus, since the rake arms 11 and 12 (Figure 1) are connected to piston 24 through shaft 13, they may be raised and lowered automatically in response to overload or at will by the operator by controlling the flow of the hydraulic fluid through pipe 26.

When the rake arms are in their lowest position, as shown 13 turns, piston head 24a rides upon a ring-shaped thrust bearing 27; and when the rake arms are in a raised position, the hydraulic fluid beneath piston head 24a forms a thrust bearing and supports the load. Thus, the thrust load of rake arms 11 and 12, shaft 13, piston 24, and the driving mechanism are supported at all times either upon bearing 27 or the bearing formed by the oil cushion beneath the piston head 24a.

The driving mechanism for the rake arms 11 and 12 is mounted upon the upper end of piston 24. This mechanism has a housing including an upper plate, an internal gear, and a lower plate, generally indicated at 28, 29, and 30. Plates 28 and 30 have flange portions 28a and 30a which extend toward each other and between which internal gear 29 is mounted. Plates 28 and 30 and gear 29 are secured together in any suitable manner, such as by bolts (not shown). The housing, as a unit, is prevented from rotating with respect to cylinder 21 by a series of rods similar to rod 31 which are mounted on bosses similar to boss 30b on plate 30 and extend downwardly therefrom. Rods 31 coact with stops similar to stop 32 formed on cylinder flange 21c to prevent rotation of the housing with respect to cylinder 21 while allowing the driving mechanism to be raised and lowered by movements of the piston 24.

The driving mechanism is connected to piston 24 through the hub 33a of an internal gear 33. Hub 33a extends through a hole 30b in plate 30 and is connected by screws 34 to a ring plate 35. Ring plate 35 is connected by a flange 35a in any suitable manner, such as by welding, to the upper end of cylinder 24b. Ring plate 35 also supports the housing of the driving mechanism by a ring shaped thrust bearing 36. As the housing of the driving mechanism is held in a stationary position by rods 31, when gear 33 drives piston 24, the housing rides on bearing 36.

An electric motor 37 is mounted upon the top of plate 28 in any suitable manner, such as by bolts (not shown), preferably with sufficient lateral play to assure even distribution of loading between the driven gears 39 and 40. The motor 37 drives internal gear 33 through pinion 38 and a pair of floating planetary gears, generally indicated at 39 and 40. Pinion 38 coaxial with gear 33 drives planetary gears 39 and 40 which are diametrically positioned with respect to the axis of pinion 38; and the upper dirven portions 39a and 40a of the planetary gears engage stationary internal gear 29. The lower driving portions 39b and 40b of planetary gears 39 and 40, which are integrally formed with the driven portions of these gears, engage the teeth of internal gear 33, which as previously indicated is integral with a flange 33c, the hub 33a, and the body portion 33b of gear 33. Planetary gears 39 and 40 have lower surfaces 42 and 43 of substantial area which rest upon a plane upper surface of the body portion 33b of gear 33. The driven portions of planetary gears 39 and 40 are of slightly greater diameter than the driving portions of these gears and thus each time these gears make a revolution, gear 33 is turned by an amount equal to the difference in the number of teeth between gears 39a and 40a and gears 39b and 40b, respectively. The driving ratio between pinion 38 and driving gear 33 may be, for example, 3000/1 and thus piston 24 and the rake arms are driven by motor 37 at a very slow rate.

In operation, whenever an excess of solids accumulates in the bottom of tank 10 (Figure 1), it is desirable to raise rake arms 11 and 12 both to decrease the load upon motor 37 (Figure 3) and to improve the efficiency of operation. To accomplish this, hydraulic fluid is introduced through pipe 26 (Figure 3) beneath the head 24a of piston 24 which results in the raising of piston 24 and with it shaft 13. During this time rotation of the rake arms continues and the weight of the rake arms 11 and 12, shaft 13, piston 24, and the driving mechanism rides upon the cushion of hydraulic fluid beneath the piston head. When solids are entering tank 10 at a rate less than solids can be removed from the tank, then the rake arms may be lowered by exhausting the hydraulic fluid from beneath piston head 24a. Thus the operator of the tank has complete control of the vertical position of the rake arms at all times and may easily and quickly raise or lower the rake arms in the tank to any desired degree. Or the raising and lowering mechanism can be automatically controlled, if desired, e. g. as described and claimed in a copending application, Serial No. 588,278, now Patent No. 2,553,958, May 22, 1951.

The rake arms 11 and 12 are turned within tank 10 by motor 37 which acts through pinion 38, planetary gears 39 and 40, internal driving gear 33, piston 24, and shaft 13. The torque reaction of the driving mechanism is taken by rods similar to rod 31.

Figure 4:
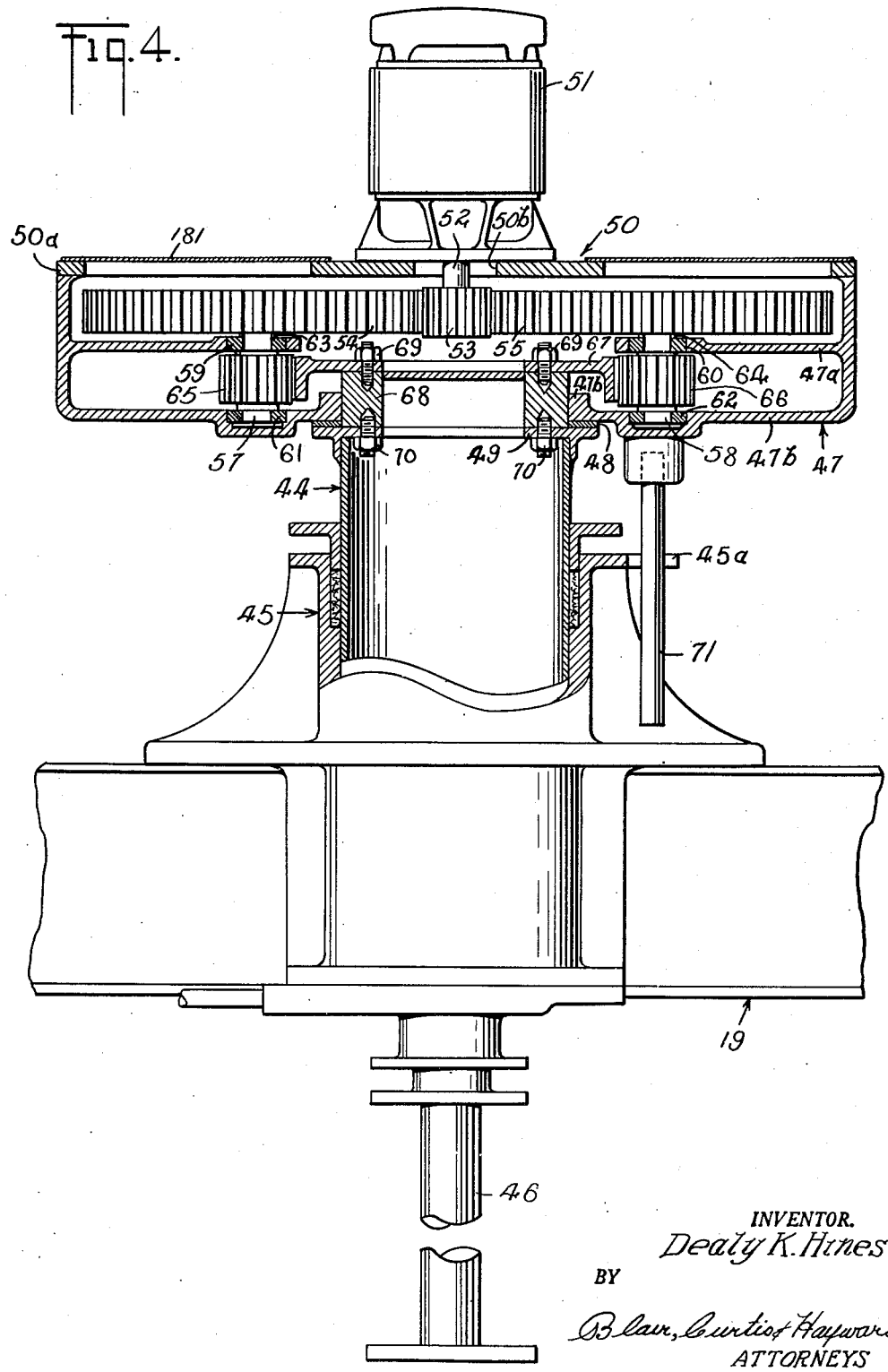
Figure 4 is a view similar to Figure 3 showing a modified structure embodying the invention.

Referring now to Figure 4, a modification of the driving portion of the mechanism described hereinabove is shown. In this modification, piston 44, cylinder 45, and shaft 46 are similar in construction and operation to the piston 24, cylinder 21, and shaft 13, as described hereinabove. The cylinder 45 of this modification is mounted upon a bridge beam, generally indicated at 19, extending transversely across the top of the sedimentation tank in a manner similar to the mounting of cylinder 21 as described hereinabove. The driving mechanism of this modification is mounted on a housing, generally indicated at 47, which is supported by a thrust bearing 48 mounted on a ring plate 49 secured to the upper end of piston 44 in any suitable manner, such as by welding. Housing 47, which is cylindrically shaped, is covered by a plate 50 which is secured to housing 47 in any suitable manner, such as by screws (not shown) and access openings 50a therein are covered by discs 181. An electric motor 51 is mounted in the center of plate 50 and is secured thereto by screws (not shown) and its shaft 52 extends through a hole 50b in plate 50. A pinion 53 is keyed to the lower end of shaft 52 and drives intermediate gears 54 and 55 which are mounted upon the upper ends of a pair of vertically positioned shafts 57 and 58 diametrically positioned with respect to the axis of pinion 53. The upper bearings 59 and 60 for shafts 57 and 58 are mounted on an inwardly extending flange portion 47a of housing 47 and the lower bearings 61 and 62 are mounted upon the bottom 47b of housing 47. Gears 54 and 55 are keyed to shafts 57 and 58 and are supported by thrust bearings 63 and 64. A pair of pinions 65 and 66 are mounted on and keyed to shafts 57 and 58 beneath flange 47a. These pinions drive a driving gear 67 which is connected to a cylindrically shaped hub 68 by screws 69. Hub 68 extends through a hole 47b in housing 47 and is connected to ring plate 49 by screws 70.

Rotation of housing 47 with respect to cylinder 45 is prevented by a series of rods similar to rod 71 which are mounted on housing 47 and coact with stops similar to stop 45a on cylinder 45 in a manner similar to the coaction of rods 31 with the stops on cylinder 21 (Figure 3), as described hereinabove. Thus, when motor 51 drives pinion 53 through shaft 52, gears 54 and 55 are driven. Gears 54 and 55 drive pinions 65 and 66 through shafts 57 and 58, and pinions 65 and 66 drive driving gear 67. As the housing 47 is prevented from rotating by rods 71, the weight of the driving mechanism is borne by and housing 47 rides on thrust bearing 48 as piston 44 turns. Because of the gear ratio between pinion 53 and gears 54 and 55, and because of the ratio between pinions 65 and 66 and the driving gear, piston 44 and thus shaft 46 is slowly, powerfully, and efficiently turned by the driving mechanism. Furthermore, because of the manner in which the driving power is transmitted to piston 44 through two gear trains diametrically opposed with respect to pinion 53, a maximum of balance is achieved.

Figure 5:
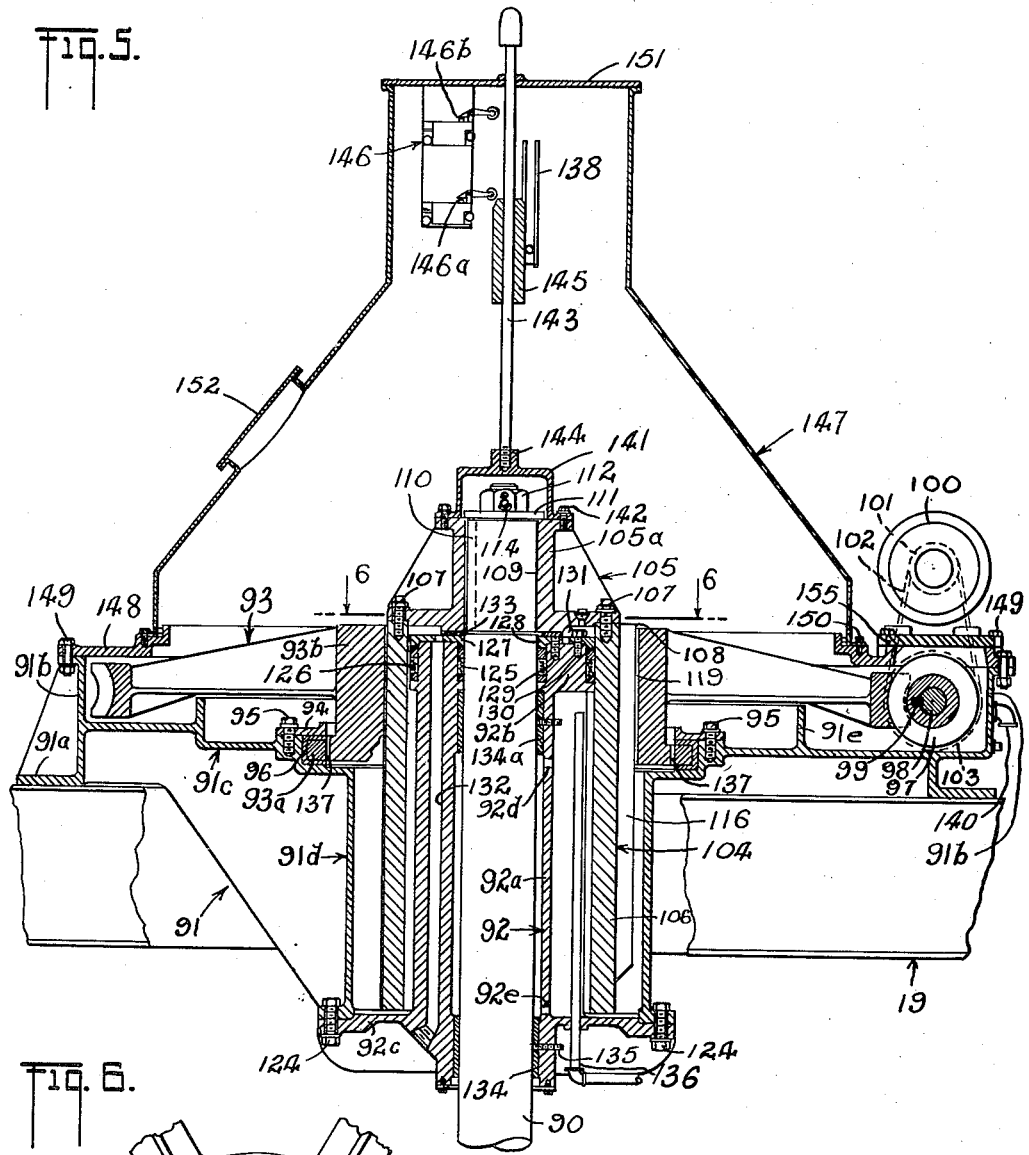
Figure 5 is a view similar to Figure 3 showing still another modification of this invention; and, Figure 6 is a horizontal section taken on line 6—6 of Figure 5.
Figure 6:
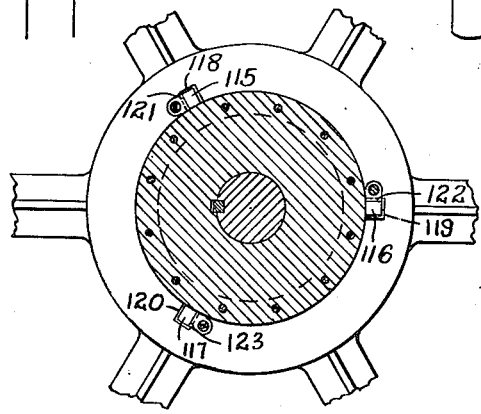

In Figures 5 and 6 another modification of my invention is shown. This mechanism is constructed to drive, raise, and lower the rake arms in a sedimentation tank through a drive shaft 90. This mechanism is supported over the center of a sedimentation tank similar to tank 10 (Figure 1) upon supporting beams, generally indicated at 19, extending transversely across the top of the tank. The housing frame of the mechanism, generally indicated at 91, is of circular shape and has a flange 91a thereon which overlaps the supporting bridge beams 19 and 20 extending across the tank, permitting the frame to be secured to the beams by means of screws (not shown). Frame 91 has a cylindrically shaped outer wall 91b, an inwardly extending section 91c for supporting the driving gear, generally indicated at 93, and a downwardly extending portion 91d for supporting the stationary piston, generally indicated at 92.

The hub of gear 93 has an outwardly extending flange portion 93a by means of which gear 93 is rotatably mounted on frame 91. This flange is mounted in a circular shaped pocket formed in the inwardly extending section 91c of frame 91 and retained therein by a clamping ring 94 secured to the frame 91 by screws 95. The bearing surfaces of this pocket are preferably lined with suitable bearing material 96 to reduce the friction of rotation of gear 96. Gear 93 is driven by three electric motors positioned 120° apart around the periphery of framework 91. Each of these motors is of the same type as motor 100 and drives gear 93 in a similar manner. Motor 100 drives gear 93 through a worm gear 97, the hub of which is keyed to a shaft 98 by a key 99. Shaft 98 is mounted on frame 91 on bearings (not shown) and is driven by motor 100 mounted on a plate 155 in turn mounted on a ring shaped plate 148 connected to frame 91 by screws 149. Motor 100 drives shaft 98 through a pulley 101 keyed to its drive shaft, a belt 102, and a pulley 103 keyed to shaft 98; these may be a standard multiple V-belt drive.

Gear 93 drives shaft 90 through the cylinder, generally indicated at 104 provided with a head portion, generally indicated at 105, connected to the upper end of the cylinder body 106 by screws 107. Preferably a gasket 108 is positioned between the upper end of the cylinder body 106 and head 105 to prevent leakage of the hydraulic fluid through this joint. Head 105 has an upwardly extending shaft-supporting portion 105a having a hole 109 therethrough adapted to fit the end of shaft 90. The upper end of shaft 90 is keyed to head 105 by a key 110. Shaft 90 is secured to and supported upon head 105 by a nut 112 and a washer 111 which bears against the upper end of the upwardly extending portion 105a. Nut 112 may be pinned to the threaded end of shaft 90 by a pin 114. By virtue of this connection, when cylinder 104 moves upwardly and downwardly through gear 93, the shaft 90 and with it the rake arms are raised and lowered.

To accommodate such movement while maintaining a driving connection between gear 93 and cylinder 104, a plurality of vertically positioned keys 115, 116, and 117 (Figures 5 and 6) are formed on the outer surface of cylinder body 106. These keys ride in key slots 118, 119, and 120 which are formed in the hub 93b of gear 93. Gear 93 is driven in a clockwise direction, as viewed in Figure 6, and each key slot is lined with bearing material 121, 122, and 123 on the driving sides of the key slots to minimize friction as cylinder 104 moves upwardly and downwardly with respect to gear 93 while gear 93 is driving the cylinder.

Piston 92 is stationary and, mounted on the frame 91, extends between shaft 90 and cylinder 104. The body 92a of piston 92 is cylindrically shaped, it has a head portion 92 formed on its upper end, and an outwardly extending flange portion 92c formed on its lower end. Flange portion 92c is connected to the downwardly extending section 91d of framework 91 by a series of bolts 124 and a gasket is preferably positioned between framework 91 and flange 92c to prevent leakage at this joint. The head portion 92b of piston 92 has piston packing rings 125 and 126 positioned on its inner and outer surfaces to coact with the surface of shaft 90 and the inner wall of the cylinder body 106. These packing rings are held in position by retaining rings 127 and 128 which are connected to the upper end of piston 92 by screws, such as screws 129 and 130.

Hydraulic fluid is introduced into a pocket 131 between head 105 and the upper end of piston 92 through a passage 132 formed in an enlarged portion of the piston wall. Hydraulic fluid entering pocket 131 raises cylinder 104 with respect to piston 92 and shaft 90, being connected to the cylinder head, is raised and lowered as the hydraulic fluid enters and is exhausted from pocket 131.

When shaft 90 is in its lowermost position, as shown in Figure 5, the thrust load of the cylinder, shaft and rake arms is carried by a thrust bearing 133 and when the cylinder 104 is raised, then the hydraulic fluid beneath the cylinder head 105 carries the cylinder while permitting its free rotation and thus take the place of bearing 133. To aid in maintaining shaft 90 vertically aligned with respect to the driving mechanism, a bearing 134 is positioned between the lower end of piston 92 and shaft 90. This bearing is held in place by a screw 135.

To insure lubrication of the bearing of gear 93, the connection between gear 93 and cylinder 104, and bearings 134 and 134a, a reservoir of lubricating oil is maintained between the outer surface of shaft 90 and framework 91. The level of the oil in this reservoir is governed by the upper end of overflow pipe 136 and it flows into the space between the outer surface of shaft 90 and the inner surface of piston 92 through ports 92d and 92e. The oil in this reservoir also flows through a series of ports similar to ports 137 in bearing flange 93a from a portion of this reservoir positioned between an annular flange 91e formed on framework 91 and the hub of gear 93. An additional reservoir for lubricating worm gear 97 and gear 93 is positioned between flange 91e and wall 91b of framework 91. This reservoir is filled with a heavy lubricating oil from the top and is provided with an overflow pipe 140. Thus bearings 134 and 134a, shaft 90, the bearing of gear 93, and the driving connection between gear 93 and cylinder 104 are all efficiently lubricated from oil in the reservoir first described and the worm gear drive is lubricated from the second-mentioned reservoir.

The amount cylinder 104 may be raised is preferably controlled by a limit switch, generally indicated at 146. Switch 146 is actuated by a sleeve 145 slidably mounted on a rod 143 which in turn is mounted on a cap 141 secured to the upper end of cylinder 104 by screws 142. Sleeve 145 is mounted on a track 138 which limits downward movement of sleeve 145 to the position it occupies in Figure 5. When the rake arms are raised sufficiently, the boss on cap 141 strikes the bottom of sleeve 145 causing it to actuate limit switch 146a, and by suitable well-known mechanism (not shown), the flow of the hydraulic fluid is cut off. A switch (not shown) is provided to shunt switch 146a if it is desired to further raise the rake arms, and when this switch is closed manually, the rake arms may be raised until sleeve 145 strikes limit switch 146b which through suitable mechanism shuts off the hydraulic fluid. Thus, the raising of the rake arms beyond a certain limit is automatically prevented and then, if it is desirable, by manual control the rake arms may be further elevated a short distance.

The driving mechanism is enclosed by a housing, generally indicated at 147, the lower edge of which is connected to ring plate 148. Housing 147 is provided with hatches 151 and 152 therein through which the mechanism described hereinabove may be inspected.

Thus, in operation, motor 100 through worm gear 87 drives gear 93 which is mounted on framework 91 by bearing flange 93a. As gear 93 is driven, it turns cylinder 104 through its connection thereto by keys 115, 116, and 117 which coact with key slots 118, 119, and 120 in the hub 93b of gear 93. When it is desired to raise cylinder 104 with respect to piston 92, hydraulic fluid is introduced into space 131 between the cylinder and piston heads through passage 132. This causes the cylinder 104 to move upwardly with respect to piston 92, which is stationary, thus raising shaft 90 and the rake arms in the sedimentation tank. The driving connection between cylinder 104 and gear 93 is maintained during movement of cylinder 104 by keys 115, 116, and 117 which slide in their respective key slots. The bearing surfaces of flange 93a, keys 115, 116, and 117, and the driving connection between gears 93 and 87 are lubricated by oil maintained in a reservoir formed by the framework 91 and piston 92. The level of this oil is controlled by overflow outlets 136 and 140 so that the above-mentioned connections are at all times efficiently lubricated.

Thus practical and efficient mechanism has been described for driving, raising and lowering the rake arms in a sedimentation tank. The mechanism for raising and lowering the rake arms is easily controlled and may be accomplished by the operator with a minimum of effort. Furthermore, through the driving connections described, the rake arms may be raised and lowered with a minimum of friction without interrupting the driving of the rake arms. Thus it will be seen that the several objects mentioned hereinabove, as well as many others, have been accomplished.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In sedimentation apparatus, in combination, a sedimentation tank having a discharge for settled solids in the bottom portion thereof, an inlet for the material to be treated, said inlet being vertically spaced from said solids discharge and a clarified liquid discharge spaced from both said inlet and said settled solids discharge, a shaft vertically positioned in said tank, rake means mounted on said shaft for raking settled solids toward said solids discharge, supporting means extending transversely across said tank, a piston mounted on said supporting means, a cylinder cooperating with said piston to define an expansible chamber, means connecting said shaft and said cylinder, a driving gear of substantial size, said cylinder extending through the center of said driving gear, key means connecting said driving gear and said cylinder to permit vertical movement of said cylinder with respect to said driving gear, means for driving said driving gear, and means for supplying a hydraulic fluid to and exhausting it from said expansible chamber to raise and lower respectively said shaft and rake means.

2. In sedimentation apparatus, in combination, a sedimentation tank having a discharge for settled solids in the bottom portion thereof, an inlet for the material to be treated, said inlet being vertically spaced from said solids discharge and a clarified liquid discharge spaced from both said inlet and said settled solids discharge, a shaft vertically positioned in said tank, rake means mounted on said shaft for raking settled solids toward said solids discharge, supporting means extending transversely across said tank, a housing mounted on said supporting means, a piston secured to said housing, a cylinder cooperating with said piston to define an expansible chamber, means connecting said cylinder and said shaft, a driving gear of substantial size, means mounting said driving gear on said housing to permit rotation of said gear with respect to said housing, means for driving said driving gear, said cylinder extending through the center of said driving gear, key means operatively connecting said cylinder and said driving gear, said key means being vertically positioned to permit vertical movement of said cylinder with respect to said driving gear, and means for supplying a hydraulic fluid to and exhausting it from said expansible chamber to raise and lower respectively said shaft and rake means.

DEALY K. HINES.

REFERENCES CITED

The following references are of record in the file of this patent:

UNITED STATES PATENTS

| Number | Name | Date |
|---|---|---|
| 867,958 | Dorr | Oct. 15, 1907 |
| 1,851,684 | Pruss | Mar. 29, 1932 |
| 1,995,559 | Andrews | Mar. 26, 1935 |
| 2,126,884 | Hardinge | Aug. 16, 1938 |
| 2,295,943 | Finney | Sept. 15, 1942 |
| 2,360,817 | Scott | Oct. 17, 1944 |

FOREIGN PATENTS

| Number | Country | Date |
|---|---|---|
| 870,533 | France | Dec. 12, 1941 |